US005223581A

United States Patent [19]

Nielsen et al.

[11] Patent Number: 5,223,581

[45] Date of Patent: Jun. 29, 1993

[54] POLYMERS FOR THE RELEASE OF PHOTOGRAPHICALLY USEFUL GROUPS

[75] Inventors: Ralph B. Nielsen; David T. Southby, both of Rochester; Katherine Root, Rush; Hwei-Ling Yau, Rochester, all of N.Y.

[73] Assignee: Eastman Kodak Company, Rochester, N.Y.

[21] Appl. No.: 837,800

[22] Filed: Feb. 19, 1992

[51] Int. Cl.$^5$ .................. C08F 220/40; C08F 226/06; G03C 5/26

[52] U.S. Cl. .............................. 525/326.8; 525/327.1; 430/448

[58] Field of Search ........................... 525/326.8, 327.1

[56] References Cited

U.S. PATENT DOCUMENTS 4,877,720 10/1989 Sato et al. ........................... 430/512
5,019,492 5/1991 Buchanan et al. .................. 430/543

FOREIGN PATENT DOCUMENTS 4020058 1/1992 Fed. Rep. of Germany .

*Primary Examiner*—Joseph L. Schofer
*Assistant Examiner*—Wu C. Cheng
*Attorney, Agent, or Firm*—Foley & Lardner

[57] ABSTRACT

A polymeric material is provided comprising a blocked photographically useful group (PUG). The incorporated blocked photographically useful group includes a PUG and a blocking group that is capable of releasing the PUG upon processing the photographic element, wherein the blocking group (a) is capable of reacting with a dinucleophile reagent, and (b) comprises two electrophilic groups that are separated from each other by a substituted atom that enables a nucleophilic displacement reaction to occur with release of PUG upon processing the photographic element in the presence of a dinucleophile reagent, wherein the group that is less electrophilic is bonded directly or through at least one releasable timing group to the PUG.

Photographic elements and emulsions including the inventive polymers, and processes for developing an image in the elements, are also provided.

20 Claims, No Drawings

POLYMERS FOR THE RELEASE OF PHOTOGRAPHICALLY USEFUL GROUPS

BACKGROUND OF THE INVENTION

This invention pertains to polymeric compounds including photographically useful groups, and to photographic elements and processes incorporating said polymeric compounds.

Compounds including photographically useful groups (PUGs) desirably are incorporated in film or paper coatings in an inactive, or blocked, form so that they can be activated during photographic processing. Most commonly, PUGs are released as a function of image formation during the photographic development process. In typical color photographic elements, this is often accomplished by using couplers or competitors which release PUGs, such as development inhibitors or bleach accelerators, as a result of reaction with oxidized developing agent.

This is a useful method of releasing PUGs, but often such imagewise release is not the most advantageous. First, it is often difficult to identify PUG-releasing compounds which simultaneously satisfy multiple photographic requirements. For example, PUG-releasing couplers must form dyes of acceptable hue, must be easily prepared, and must have proper reactivity, chemical stability, and dispersion stability. Second, the release of PUGs in an imagewise fashion can degrade image quality, caused, for instance, by the consumption of oxidized developing agent without image formation. Third, many types of PUGs are preferably released uniformly, and not as a function of image formation.

Non-imagewise release of PUGs by cleavage of a PUG from an immobilizing group or an inactivating group, such as a ballast group, a blocking group or a polymer, is therefore desirable. It would be desirable to have a blocking group immobilize a PUG in a photographic element until the blocking group is released during processing, after which the PUG becomes mobile. An example of this would be a filter dye which is immobilized in a layer until processing, when it is released and washed out of the film. Another example would be an immobilized bleach-accelerator fragment which is released during processing and can then interact with the surface of the silver metal in the photographic element. Yet another example would be a blocked, incorporated silver halide developing agent which is released into the photographic element upon treatment with an activator solution containing a dinucleophile. Clearly, many other types of PUGs could be desirably employed in this manner.

However, PUGs attached to immobilizing groups or inactivating groups through a group subject to simple hydrolysis at a rate which is dependent only on the pH of the medium have been shown in most cases to be inadequate. It is known that if such release occurs rapidly in typical alkaline development processes, then the compounds are likely to be unstable during the natural ageing of the photographic element. Conversely, if such compounds are stable during the natural ageing process, then they are unlikely to be sufficiently reactive under typical processing conditions.

One approach to this dilemma is to devise a release mechanism which is dependent on a specific component in the processing solution, and not on pH alone. In other words, a "trigger" in a processing solution causes the release of PUG. Examples of this are found in U.S. Pat. Nos. 4,877,720 and 4,916,047, which disclose polymeric materials in which a bond to a PUG is broken after a blocking group is reduced by a photographic developing agent. One drawback to this approach, however, is that release occurs only in the presence of a developing agent: release cannot be triggered by a processing solution which does not contain a silver-halide developing agent. Also, such blocking groups must be carefully designed in order to be readily reduced by developing agent. Therefore, the compounds can be complicated and difficult to prepare. Furthermore, one would expect to observe non-imagewise formation of oxidized developing agent when such compounds are present in a photographic element, which would lead to undesirable non-imagewise dye formation in typical color photographic elements.

The "β-ketoester" (strictly, β-ketoacyl) blocking chemistry disclosed in U.S. Pat. No. 5,019,492 has enabled production of stable, inactive blocked compounds from which PUGs are rapidly released upon reaction with a dinucleophile, such as hydroxylamine, under alkaline conditions. These blocking groups have been shown to be stable during natural ageing of photographic elements containing them. Release of PUGs occurs without undesirable production or consumption of oxidized developing agent. However, the most reactive blocking groups are not sufficiently large to act as immobilizing groups, or hydrophobic ballasts, for a PUG. Also, in most cases, substitution of the blocking group with a hydrophobic ballast group substantially decreases the reactivity of the blocking group toward dinucleophiles. Furthermore, these compounds are often crystalline and must be prepared as a dispersion in a photographic element, which introduces difficulties such as unwanted variability in the dispersion-making process and unwanted crystallization of dispersed compounds.

There has thus been a need for a material including PUGs which overcomes the disadvantages of the known materials. It would be highly desirable to provide a material which is capable of timely release of PUG with good stability. It would also be desirable to provide materials incorporating PUGs whose hydrophilicity, dispersibility, and mechanical and other properties can be adjusted to meet various processing needs.

SUMMARY OF THE INVENTION

These needs have been satisfied by providing a polymeric material comprising a blocked photographically useful group comprising the group $$BG-(T)_n-PUG$$

wherein

- PUG is a photographically useful group (PUG),
- T is a timing group,
- n is an integer from 0 to 3, and
- BG is a blocking group which is capable of releasing the PUG upon processing the photographic element, wherein the blocking group (a) is capable of reacting with a dinucleophile reagent, and (b) comprises two electrophilic groups that are separated from each other by a substituted atom that enables a nucleophilic displacement reaction to occur with release of PUG upon processing the photographic element in the presence of a dinucleophile reagent, wherein the group that is less electrophilic is bonded directly or through at least one releasable timing group to the PUG. In preferred embodiments, the inventive polymer comprises pendent blocked PUGs. In further preferred embodiments, the blocked PUGs are integral with the main chain of the polymer.

In accordance with another aspect of the invention, there has been provided a photographic element comprising a support bearing at least one photographic silver halide emulsion and, associated therewith, a polymer as defined above.

In accordance with yet another aspect of the present invention, there has been provided a process for developing an image in a photographic element comprising a support, a silver halide emulsion and a polymeric material as defined above, which comprises the step of contacting the element with a processing solution in the presence of a dinucleophile. In a preferred embodiment, the processing solution comprises a photographic silver halide developing agent.

DETAILED DESCRIPTION OF THE PREFERRED EMBODIMENTS

It has now been discovered that blocked photographically useful groups can be incorporated into polymeric materials to produce highly stable polymers having a wide range of properties. The invention polymers achieve timely release of PUG in processing solutions with a dinucleophile, and they exhibit good stability during natural film ageing or in processing solutions in the absence of a suitable dinucleophile.

The polymeric materials of this invention offer numerous advantages which are not offered by previous polymeric or monomeric blocked PUGs. The blocking groups are released without the undesirable effects, such as image degradation, that accompany compounds which release PUGs in an imagewise fashion after reaction with oxidized developing agent. The polymeric materials can also be used to release PUGs which are desirably or necessarily released in a non-imagewise manner. Release of PUGs occurs without undesirable formation of oxidized developing agent. Furthermore, the polymeric materials of this invention can be made inherently immobile or diffusion resistant, because of their molecular weight.

Properties of the invention polymers can be varied uniformly in order to optimize photographic performance. This can be accomplished, for instance, by variation of copolymer composition or polymer molecular weight. By contrast, abrupt differences in reactivity or crystallinity often exist between non-polymeric compounds with minor differences in chemical structure. In the same vein, most inventive polymers used in photographic elements are not subject to unwanted crystallization when dispersed, thus avoiding variability in reactivity of the compounds in different coatings, and physical defects in the coated layers of the element. Such polymers also avoid the problem of blooming, or the formation of deposits on the surface of a photographic element typically caused by crystallization of dispersions in the topmost layer of the element.

In addition, many polymers of the invention, including aqueous solution polymers, aqueous latexes, and aqueous self-dispersing polymers can be introduced directly into a photographic element, avoiding the difficulties associated with dispersion preparation. Furthermore, photographic layers comprising such polymers can have improved uniformity, improved physical integrity and improved optical properties compared to layers comprising dispersed compounds.

Polymers of the invention can also have enhanced rates of PUG release, compared to hydrophobically ballasted non-polymeric compounds. This applies especially toward aqueous solution polymers, aqueous latexes, and aqueous self-dispersing polymers, and polymers which contain ionic groups or groups which are ionizable in a processing solution. A possible reason for this is that hydrophilic polymers, which are rendered diffusion resistant because of molecular weight, are better able to encounter the dinucleophile, which is also hydrophilic. Hydrophobic low-molecular weight compounds are undesirably protected in the dispersion from the dinucleophile, and hydrophilic low-molecular weight compounds are not diffusion resistant. This enhanced reactivity can allow for useful rates of PUG release in shorter times, lower temperature, with lower concentrations of a dinuclophile, or under less strongly alkaline conditions than required for non-polymeric blocked PUGs.

The polymeric materials according to the invention can comprise a plurality of monomeric units, which individually comprise a blocked photographically useful group. The blocked PUG can be the same or different in each monomer. Thus, the inventive polymer can be a copolymer of monomers comprising different blocked PUGs, or a copolymer of different monomers which in turn can comprise the same or different blocked PUGs. The inventive polymer can also be a copolymer of at least one monomer comprising a blocked PUG and at least one monomer without a blocked PUG.

Monomeric units useful in producing the inventive polymers can includes monomers which are polymerizable by any procedure or method which is compatible with the monomer structures and which produces polymers of sufficient molecular weight. Such methods can include, for example, free-radical polymerization, condensation polymerization, cationic polymerization, ring-opening polymerization, etc. Exemplary monomers include ethylenically unsaturated monomers having pendant blocked PUGs. Various unsaturated monomers are useful in the preparation of polymers of the invention, either as polymerizable monomers substituted with pendant blocked PUGs or as comonomers in the preparation of copolymers of the invention. These include ethylene, propylene, 1-butent, 2-butene, $(C_{1-6})$alkacrylic acids, in particular acrylic acid and methacrylic acid, $(C_{1-6})$alkyl (alk)acrylates, in particular $(C_{1-6}$alkyl acrylates and methacrylates, vinyl esters, such as vinyl acetate, vinyl ethers, vinyl chloride, vinylidene chloride, vinyl ketones, (alk)acrylonitriles, unsubstituted and substituted (alk)acrylamides, (alk)acryloyl chlorides, maleic acid, fumaric acid, itaconic acid, mesaconic acid, crotonic acid and $(C_{1-6})$alkyl esters thereof, maleic anhydride, allyl chloride, allyl acetate, polyolefins such as butadiene, isoprene, cyclopentadiene, N-vinylpyrrolidone, N-vinylimidazole, aromatic vinyl monomers such as unsubstituted and substituted styrene, $\alpha$-methylstyrene, vinyl benzoate, cinnamic acid, stilbene, and other known ethylenically unsaturated monomers. The monomers optionally can be further substituted with, for example, $(C_{1-6})$alkyl, halogen or other substituents which do not adversely affect the blocked PUG.

Useful condensation polymers include polyamides, polyesters, polycarbonates, polyurethanes, polyureas, polysulfones, polysiloxanes, etc. These polymers can be produced from PUG-substituted monomers such as PUG-substituted diacids, diamines, diisocyanates, glycols, etc. as appropriate for the particular condensation polymer. Polymers having multiple functionality, such as, for example, urethane and urea groups, or urethane and carbonate groups, are also useful within the scope of the present invention. Also, the inventive polymers can be cross-linked, including, for example, epoxy resins, novolaks, etc.

Other useful monomers having pendant blocked PUGs include substituted ethylene oxide, propylene oxide or other epoxides, substituted isocyanides, substituted ethylenimines, substituted tetrahydrofurans, and other monomers which can undergo ring-opening polymerization.

Polymers which comprise blocked PUGs according to the invention can also be prepared by modification of preformed polymers. Examples of polymers which can be substituted with blocked PUGs include synthetic polymers, polysaccharides (including starch, cellulose and pullulan), polypeptides, gelatin, etc.

Polymers of the invention can be homopolymers, random copolymers, alternating copolymers, or block copolymers. The polymers can be linear or branched. Such variations in the structures of these polymers can affect the reactivity, stability, solution properties and other important photographic properties of the polymers.

The polymers according to the invention can be hydrophobic or hydrophilic. They can be water-soluble, water-dispersible, latex, crosslinked latex, or soluble in organic solvents. The polymers can contain crosslinkable groups or groups which participate in the hardening reaction of a photographic element. The properties of the polymer will affect the method of introduction into film layers, such as simple addition of aqueous solution polymers or latexes, or a typical dispersion-making process for those soluble in organic solvents. The properties of the polymer will also affect the reactivity of the blocked PUG groups toward attack by dinucleophiles. The polymers can be uncharged, or have anionic, cationic, or zwitterionic character depending on the particular substituents on the monomer or monomers. The polymers can also have ionizable groups to change the polymer's reactivity during processing.

Polymers produced according to the invention which are hydrophilic or which contain ionizable groups may be immobile (that is, non-wandering, diffusion resistant) because of molecular weight while retaining chemical reactivity that can be lost by attaching a hydrophobic ballast. Many polymers according to the invention require no dispersion preparation, eliminating coupler solvents and some variability which comes from the dispersion process. Aqueous polymer solution or aqueous latex may be added directly to the coating solutions. Polymeric materials also eliminate problems commonly associated with dispersions, such as blooming and crystallization.

Films with polymers according to the invention added can display better physical properties than films with conventional dispersions, because of less disruption of the physical structure of the polymeric binder, i.e., gelatin.

Films can also have better optical properties, with less light scattering from dispersion particles, and possibly with thinner layers obtained by partial replacement of the binder with the functional polymer. This advantage can be especially pronounced in applications such as filter-dye polymers where substantial levels of the PUG are needed, and the PUG is coated above an imaging layer.

Photographic performance can be fine-tuned by continuous variation of copolymer compositions, compared to more abrupt differences which can exist between structurally similar small molecules.

Various polymers of the invention incorporating the group BG-$(T)_n$-PUG can be used. The group BG-$(T)_n$-PUG can be pendant to the main polymer chain, or it can be incorporated in the polymer chain. For example, polymers containing any of the following structures fall within the scope of the invention:

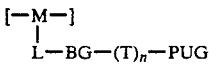

(a)

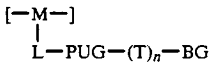

(b)

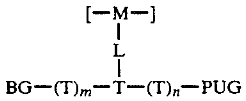

(c)

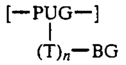

(d)

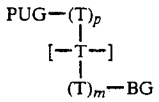

(e)

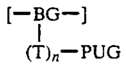

(f)

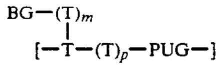

(g)

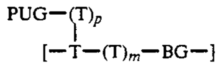

(h)

$[-BG-(T)_n-PUG-]$ (i)

Here,

M is a polymerizable monomer residue, that is, the monomer without the blocked PUG, L is a bond or a divalent linking group which connects BG to M, and which is not cleaved during processing, T is a timing group, BG is a blocking group, PUG is a photographically useful group, n is an integer from 0 to 3, and m and p are integers chosen such that the sum m+p is from 0 to 2.

In polymers of type (a), the PUG is pendant to the monomer unit, and thus is bound to the polymer chain through the blocking group, which in turn can be connected to the polymer chain through a linking group. An optical timing group or groups can be inserted between the blocking group and the PUG. Polymer type (b) involves a functional polymer that is substituted by the blocking group, where the functionality is changed during processing. Polymer type (c) is similar to type (a), except that a timing group is attached permanently to the polymer chain, directly or through a linking group, and cleavage of the blocking group leads to eventual expulsion of the PUG. Polymers of types (a)-(c) can be prepared, for example, from ethylenic unsaturated monomers, from free-radical polymerizable monomers, from other monomers which can participate in addition polymerization or from condensable monomers.

In polymer types (d)-(i), one or more of the PUG, timing group(s) or blocking group are present as components of the main polymer chain. In polymer types (g)-(i), release of the PUG from the blocking group also cleaves the polymer chain. These polymers are most suitably prepared from condensable monomers, with condensable functionalities being present on the PUG and/or the blocking group and/or the timing group as required.

Preferred structures for the blocking group represented by BG in polymers above are represented by the following formula:

$$E_1—(Y^1)—E_2$$

wherein $E_1$ and $E_2$ independently are electrophilic groups, wherein $E_1$ is more electrophilic than $E_2$, and wherein $E_2$ is connected to $(T)_n$-PUG as described above, and $Y^1$ is a substituted atom that provides a distance between $E_1$ and $E_2$ that enables a nucleophilic displacement reaction to occur with release of PUG upon processing said photographic element in the presence of a dinucleophile.

$E_1$, $E_2$ and $Y^1$ can have additional points of attachment to the polymer is appropriate to the structure of the polymer.

Appropriate blocking groups represented by BG in the above polymer structures will vary with the polymer type. For polymer types (b)-(e) and (g) a blocking group is appropriate which attaches to the PUG, optionally through one or more timing groups, but the blocking group has no other point of attachment to the polymer molecule. For these polymer types, any of the blocking groups disclosed in U.S. Pat. No. 5,019,492, which is hereby incorporated in its entirety by reference, could be employed. Possible structures for the blocking group represented by BG- in polymers types (a), (f), (h) and (i) above are similar except that and at least one of the groups $E_1$, $E_2$ or $Y^1$ further are connected to the polymer molecule other than through the timing group T or PUG attached to the group $E_2$.

A preferred sequence of the elements $E_1—(Y^1)—E_2$ in the foregoing blocking group structures is represented by the formula

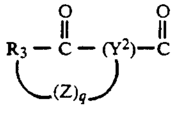

in which $R_3$ is unsubstituted or substituted alkyl, unsubstituted or substituted aryl, or the atoms necessary with Z to complete a ring with $Y^2$, Z represents the atoms necessary to complete a carbocyclic or heterocyclic ring with $R_3$ and $Y^2$, $Y^2$ is a substituted carbon atom that provides a distance between the carbonyl groups that enables a nucleophilic displacement reaction to occur with release of PUG upon processing said photographic element in the presence of a dinucleophile, and q is 0 to 1.

Where appropriate for the polymer types described above, $R_3$ or $(Z)_q$ or $(Y^2)$ can have further points of attachment to the polymer molecule.

Particularly preferred are blocking group structures in which the elements $E_1—(Y^1)—E_2$ correspond to

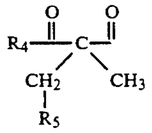

or

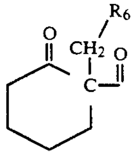

in which $R_4$ is unsubstituted or substituted alkyl, unsubstituted or substituted aryl, which can comprise a linking group or a bond (i.e., point of attachment) to the polymer, and $R_5$ and $R_6$ are individually hydrogen or a linking group or bond (point of attachment) to the polymer.

In the cyclohexanone embodiment, one of the four methylene groups in the ring can be optionally replaced with a heteroatom such as a nitrogen atom. Also, one of the ring methylene groups or the heteroatom can be substituted further. One of the cyclohexyl methylene groups can be substituted with a group $R_7$ which can be, for example, an alkyl, aryl, heterocyclic, amide, ester, ether, sulfonamide or carboxyl group. The heteroatom can be substituted with a group $R_8$ which can be, for example, an alkyl, aryl, heterocyclic, acyl, alkylsulfonyl or arylsulfonyl group, or an —N—C(O)— group. The methylene or heteroatom substituent can also comprise a linking group or point of attachment to the polymer.

The foregoing blocking groups which are appropriate to polymer types (b)-(e) and (g) are described in U.S. Pat. No. 5,019,492. Related blocking groups which are appropriate to polymer types (a), (f), (h) and (i) are similar to those described in U.S. Pat. No. 5,019,492 except that they contain at least one additional point of attachment to the polymer molecule.

The timing group(s), T, can be unsubstituted, or can contain one or more substituents to control, for example, the aqueous solubility of the precursor compound. The timing group can be a component of the polymer chain, if desired. Exemplary timing groups are disclosed in U.S. Pat. Nos. 4,248,962, 4,772,537 and 5,019,492. Up to 3 timing groups can be joined sequentially according to the invention (that is, n=0 to 3, the sum of m+p being 0 to 2).

The timing and blocking groups, and the PUG, can be unballasted or ballasted. In other words, at least one of T, BG and PUG can include a group of such molecular size and configuration as to render the present compound nondiffusible as described, for example, in U.S. Pat. Nos. 4,420,556 and 4,923,789. Advantages ballast groups include alkyl and aryl groups having from about 8 to 32 carbon atoms.

Useful structures of polymeric subunits which comprise blocking groups include, but are not limited to the following:

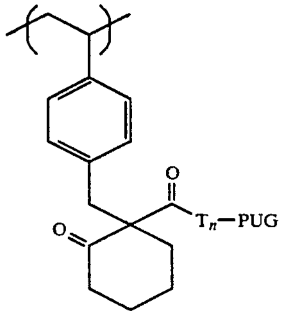

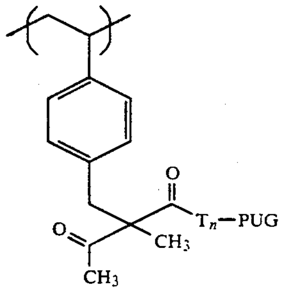

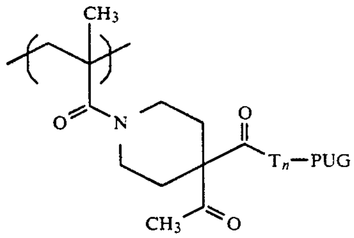

-continued

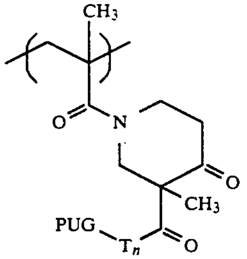

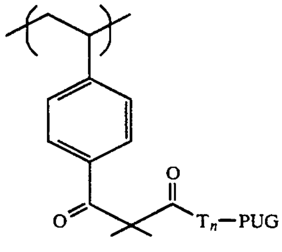

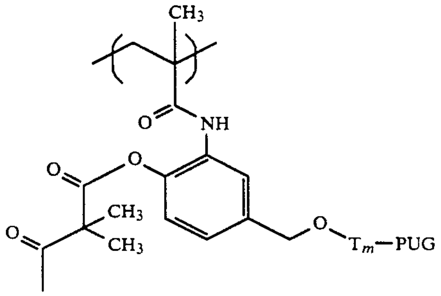

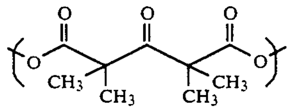

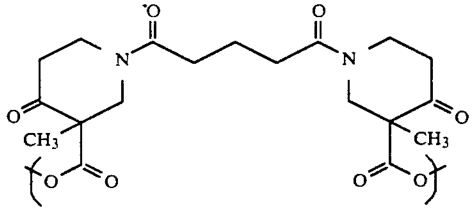

Useful structures of polymeric subunits which comprise blocking groups combined with photographically useful groups include, but are not limited to the following:

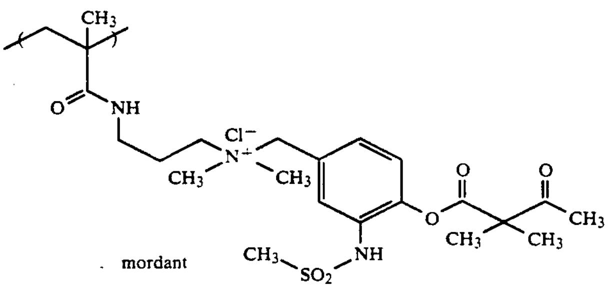

mordant

-continued
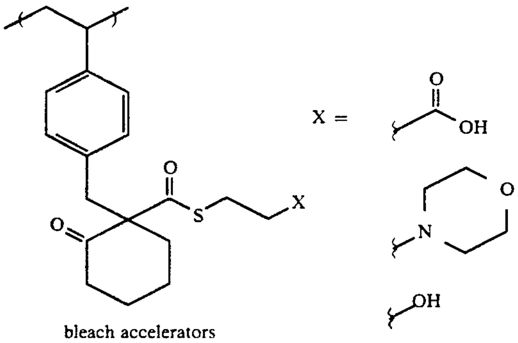
bleach accelerators
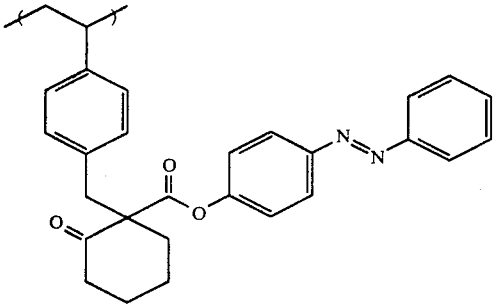
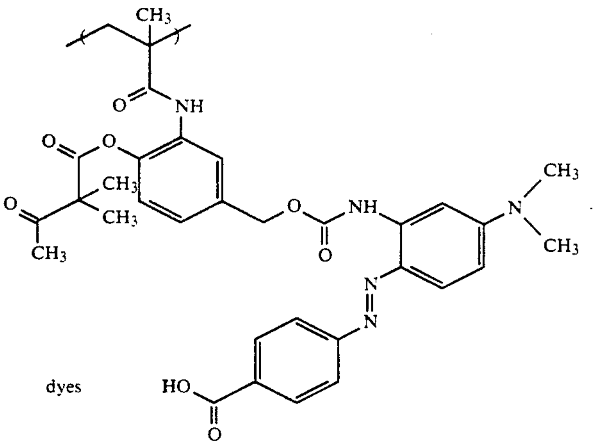
dyes
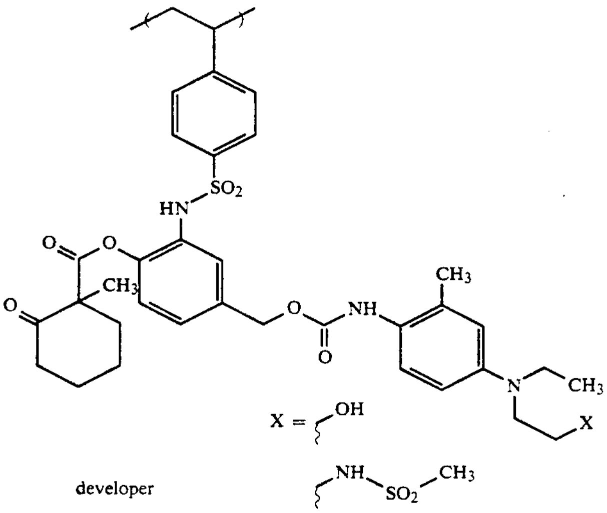
developer -continued

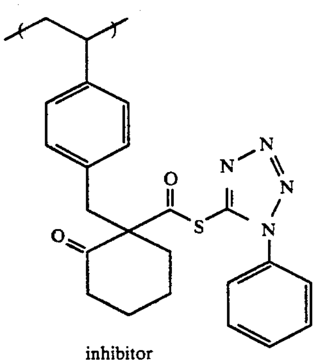

inhibitor

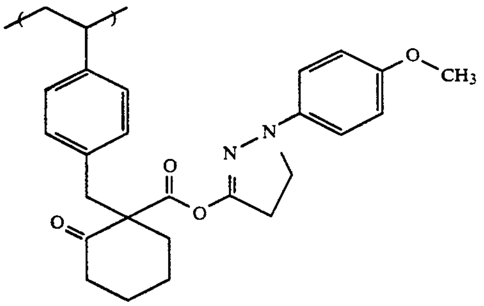

electron transfer agent

As noted, multiple monomer types as defined above can also be present in the polymers according to the invention, and the inventive polymers can also be copolymers of both monomers comprising blocked PUGs and monomers without blocked PUGs. In this way, the proportion of the monomer containing the blocked PUG can be controlled in order to produce polymers having desired properties. For some applications, approximately 100% blocked PUG-comprising monomer content may be appropriate if the physical properties of the polymer are reasonable. In other applications, polymers can be produced having much less than 1% of the blocked PUG-comprising monomer.

Polymer molecular weights can cover a very wide range. Typical polymer molecular weights will be at least about 1000. Preferably, the inventive polymers are within the range of about 2000 to $10^7$. Depending on the particular PUG(s) employed and the polymer properties, this molecular weight range can be varied. For example, in the case where a PUG is released from a water-soluble polymer, a preferred range is about 10,000 to $10^6$. Water-soluble polymers with very low molecular weight are less resistant to diffusion in a photographic element, and very high molecular weight polymers can increase the viscosity of coating solutions so that high-quality photographic elements are difficult to prepare. Polymers which are more hydrophobic or which have ballast groups may be sufficiently immobile even at lower molecular weight. Some polymers with very high molecular weight exceeding $10^7$, such as crosslinked latexes and microgels, are also useful and can be readily introduced into photographic elements.

As used herein, the term "photographically useful group (PUG)" refers to any group that can be used in a photographic material and that can be released from the blocking group as described. It refers to the part of the blocked photographically useful compound other than the blocking group (and the optional timing group). The PUG can be, for example, a photographic dye, a photographic reagent or a polymer.

A photographic reagent herein is a moiety that upon release further reacts with components in the photographic element. A polymer herein is a molecule comprising repeating units which exhibits changed function or properies upon release of the blocking group.

Such photographically useful groups include, for example, couplers (such as image dye-forming couplers, development inhibitor releasing couplers, competing couplers, polymeric couplers and other forms of couplers), crosslinking groups, development inhibitors, development accelerators, bleach inhibitors, bleach accelerators, dyes, dye precursors, developing agents (such as competing developing agents, dye-forming development agents, developing agent precursors, electron transfer agents and silver halide developing agents), reducing agents, silver ion fixing agents, silver halide solvents, silver halide complexing agents, image toners, pre-processing and post-processing image stabilizers, hardeners, tanning agents, fogging agents, antifoggants, ultraviolet radiation absorbers, optical brighteners, nucleators, nucleation accelerators, chemical and spectral agents, and precursors thereof, as well as antistatic agents, and precursors thereof, as well as other addenda known to be useful in photographic materials.

Polymeric PUGs which can be utilized include polymers for various applications. For example, a mordant polymer comprising cationic groups such as quaternary ammonium groups can be converted to an uncharged polymer upon release of a blocking group and optional timing groups, leading to improved dye removal from the photographic element. Polymers can be designed so that hydrophilic or ionizable groups are unmasked by release of blocking groups, allowing the polymer to be washed out of the photographic element during processing. Polymers of low to moderate molecular weight, such as some condensation polymers, can be chain-extended to higher molecular weight by linking the smaller fragments through difunctional molecules comprising a blocking group with optional timing groups (as in polymer types (c) and (d)), leading to polymers of higher molecular weight. These polymers can be converted again to lower molecular weight fragments upon release of the blocking groups, changing polymer properties such as reactivity and diffusiblity.

As can be seen from these examples, the use of polymers which comprise blocking groups can lead both to the loss of PUGs (i.e. mordant polymers which are disabled or small fragments, such as filter dyes, which are released from the polymer and wash out of the photographic element) and to the activation of PUGs (i.e. useful groups, such as bleach accelerators, bound to polymers but which are initially masked by a blocking group, and which must be released in order to function.) In other words, depending on the application, the release of a blocking group can lead either to the loss or appearance of photographic function.

Specific illustrative examples of useful PUG's are as follows:

I. Couplers

A. Image Dye-Forming Couplers: Illustrative couplers include cyan, magenta and yellow image dye-forming couplers that are known in the photographic art. Illustrative couplers which form cyan dyes upon reaction with oxidized color developing agents are phenols and naphthols. Representative couplers are described in the following patents and publications: U.S. Pat. Nos. 2,367,531; 2,423,730; 2,474,293; 2,772,162; 2,801,171; 2,895,826; 3,002,836; 3,034,892; 3,041,236; 3,419,390; 3,476,563; 3,772,002; 3,779,763; 3,996,253; 4,124,396; 4,254,212; 4,296,200; 4,333,999; 4,443,536; 4,457,559; 4,500,635; 4,526,864; 4,690,889; 4,775,616; and in "Farbkuppler—ein Literaturübersicht, "published in Agfa Mitteilungen, Band III, pp. 156–175 (1961). Illustrative magenta dye-forming couplers are pyrazolones, pyrazolotriazoles, pyrazolobenzimidazoles and indazolones. Typical couplers are described in U.S. Pat. Nos. 1,269,479; 2,311,082; 2,343,703; 2,369,489; 2,600,788; 2,673,801; 2,908,573; 3,061,432; 3,062,653; 3,152,896; 3,519,429; 3,725,067; 3,935,015; 4,120,723; 4,443,536; 4,500,630; 4,540,654; 4,581,326; 4,774,172; European Patent Applications 170,164; 177,765; 284,239; 284,240; and in "Farbkuppler—ein Literaturübersicht," published in Agfa Mitteilungen, Band III, pp. 126–156 (1961). Couplers which form yellow dyes upon reaction with oxidized color developing agents are typically acylacetanilides such as benzoylacetanilides and pivalylacetanilides. Representative couplers are described in U.S. Pat. Nos. 2,298,443; 2,407,210; 2,875,057; 3,048,194; 3,265,506; 3,384,657; 3,415,652; 3,447,928; 3,542,840; 3,894,875; 3,933,501; 4,022,620; 4,046,575; 4,095,983; 4,182,630; 4,203,768; 4,221,860; 4,326,024; 4,401,752; 4,443,536; 4,529,691; 4,587,205; 4,587,207; 4,617,256; European Patent Application 296,793; and in "Farbkuppler—ein Literaturü bersicht," published in Agfa Mitteilungen, Band III, pp. 112–126 (1961).

B. Couplers which form colorless products upon reaction with oxidized color developing agent are described in U.K. Pat. No. 861,138; U.S. Pat. Nos. 3,632,345; 3,928,041; 3,958,993; and 3,961,959.

C. Couplers that form black dyes upon reaction with oxidized color developing agents are preferably resorcinols or m-aminophenols. Typical couplers are described in U.S. Pat. Nos. 1,939,231; 2,181,944; 2,333,106; and 4,126,461; German OLS No. 2,644,194 and 2,650,764.

D. Illustrative couplers that are development inhibitor releasing couplers (DIR couplers) include those described in, for example, U.S. Pat. Nos. 3,227,554; 3,384,657; 3,615,506; 3,617,291; 3,733,201; 4,248,962; and U.K. 1,450,479. Preferred development inhibitors as PUG's are heterocyclic - compounds, such as mercaptotetrazoles, mercaptotriazoles, mercaptooxadiazoles, selenotetrazoles, mercaptobenzothiazoles, selenobenzothiazoles, mercaptobenzoxazoles, selenobenzoxazoles, mercaptobenzimidazoles, selenobenzimidazoles, benzotriazoles, benzodiazoles and 1,2,4-triazoles, tetrazoles, and imidazoles.

II. Dyes and Dye Precursors

Useful dyes and dye precursors include azo, azomethine, azopyrazolone, cyanine, indoaniline, indophenol, anthraquinone, triarylmethane, alizarin, nitro, quinoline, indigoid, oxanol, and phthalocyanine dyes and precursors of such dyes, such as leuco dyes, tetrazolium salts or shifted dyes. Dyes may be hue-shifted by the presence of the blocking group. These dyes can be metal complexed or metal complexable. Representative patents describing such dyes are U.S. Pat. Nos. 3,880,568; 3,931,144; 3,932,380; 3,932,381; and 3,942,987.

III. Developing Agents

Developing agents released can be color developing agents, black-and-white developing agents and cross-oxidizing developing agents. They include aminophenols, phenylenediamines, hydroquinones and pyrazolidones. Representative patents describing such developing agents are U.S. Pat. Nos. 2,108,243; 2,193,015; 2,289,367; 2,304,953; 2,592,364; 2,743,279; 2,751,297; 2,753,256; 2,772,282; 3,656,950; and 3,658,525. Developing agents disclosed in docket no. 26265/161, filed in the U.S. Patent Office on Dec. 19, 1991, are particularly preferred.

IV. Bleach Inhibitors

Representative bleach inhibitors include the illustrative bleach inhibitors described in, for example, U.S. Pat. Nos. 3,705,801; 3,715,208 and German OLS No. 2,405,279.

Preferred PUG's are also described in U.S. Pat. No. 5,019,492.

The dinucleophile of the present invention can be any of the compounds described in U.S. Pat. No. 5,019,492. Examples include hydrogen peroxide, hydroxylamines, hydrazines, amidines, diamines, amino acids, amino alchohols and amino thiols. Preferred dinucleophiles are hydrogen peroxide, hydroxylamine and monosubstituted hydroxylamine. The dinucleophile can also be a salt of any of the dinucleophilic compounds listed above.

In the following discussion of suitable materials for use in the emulsions and elements according to the invention, reference will be made to *Research Disclosure,* December 1989, Item 308119, published by Kenneth Mason Publications Ltd., Emsworth, Hampshire P010 7DQ, U.K., the disclosures of which are incorporated in their entireties herein by reference. This publication will be identified hereafter as "Research Disclosure".

The support of the element of the invention can be any of a number of well known supports for photographic elements. These include polymeric films, such as cellulose esters (for example, cellulose triacetate and diacetate) and polyesters of dibasic aromatic carboxylic acids with divalent alcohols (such as polyethylene terephthalate), paper, and polymer-coated paper.

The photographic elements according to the invention can be coated on the selected supports as described in Research Disclosure Section XVII and the reference cited therein.

The radiation-sensitive layer of a photographic element according to the invention can contain any of the known radiation-sensitive materials, such as silver halide, or other light sensitive silver salts. Silver halide is preferred as a radiation-sensitive material. Silver halide emulsions can contain for example, silver bromide, silver chloride, silver iodide, silver chlorobromide, silver chloroiodide, silver bromoiodide, or mixtures thereof. The emulsions can include coarse, medium, of fine silver halide grains bounded by 100, 111, or 110 crystal planes.

The silver halide emulsions employed in the elements according to the invention can be either negative-working or positive-working. Suitable emulsions and their preparation are described in Research Disclosure Sections I and II and the publications cited therein.

Also useful are tabular grain silver halide emulsion. In general, tabular grain emulsions are those in which greater than 50 percent of the total grain projected area comprises tabular grain silver halide crystals having a grain diameter and thickness selected so that the diameter divided by the mathematical square of the thickness is greater than 25, wherein the diameter and thickness are both measured in microns. An example of tabular grain emulsions is described in U.S. Pat. No. 4,439,520.

Suitable vehicles for the emulsion layers and other layers of elements according to the invention are described in Research Disclosure Section IX and the publications cited therein.

The radiation-sensitive materials described above can be sensitized to a particular wavelength range of radiation, such as the red, blue, or green portions of the visible spectrum, or to other wavelength ranges, such as ultraviolet, infrared, X-ray, and the like. Sensitization of silver halide can be accomplished with chemical sensitizers such as gold compounds, iridium compounds, or other group VIII metal compounds, or with spectral sensitizing dyes such as cyanine dyes, merocyanine dyes, or other known spectral sensitizers. Exemplary sensitizers are described in Research Disclosure Section IV and the publications cited therein.

Multicolor photographic elements according to the invention generally comprise a blue-sensitive silver halide layer having a yellow color-forming coupler associated therewith, a green-sensitive layer having a magenta color-forming coupler associated therewith, and a red-sensitive silver halide layer having a cyan color-forming coupler associated therewith. In a preferred embodiment, the multicolor photographic element contains a polymer according to the invention which includes a color-forming coupler as the PUG.

The elements according to the invention can include non-polymeric couplers as described in Research Disclosure Section VII, paragraphs D, E, F and G and the publications cited therein. These couplers can be incorporated in the elements and emulsions as described in Research Disclosure Section VII, paragraph C and the publication cited therein.

A photographic element according to the invention, or individual layers thereof, can also include any of a number of other well-known additives and layers. These include, for example, optical brighteners (see Research Disclosure Section V), antifoggants and image stabilizers (see Research Disclosure Section VI), light-absorbing materials such as filter layers of intergrain absorbers, and light-scattering materials (see Research Disclosure Section VIII), gelatin hardeners (see Research Disclosure Section X), oxidized developer scavengers, coating aids and various surfactants, overcoat layers, interlayers, barrier layers and antihalation layers (see Research Disclosure Section VII, paragraph K), antistatic agents (see Research Disclosure Section XIII), plasticizers and lubricants (see Research Disclosure Section XII), matting agents (see Research Disclosure Section XVI), antistain agents and image dye stabilizers (see Research Disclosure Section VII, paragraphs I and J), development-inhibitor releasing couplers and bleach accelerator-releasing couplers (see Research Disclosure Section VII, paragraph F), development modifiers (see Research Disclosure Section XXI), and other additives and layers known in the art.

Photographic elements according to the invention can be exposed to actinic radiation to form a latent image as described in Research Disclosure Section XVIII. The dinucleophile of the invention can be a component of one or more processing solutions of the process employed, or can be present in the photographic element in a blocked or unblocked form, or can be introduced during processing by some other means. The photographic elements can be processed to form an image by a process appropriate to the structure and intended function of the particular element. Such processes include those which produce silver images, either negative images or direct positive images. Such processes include those typically used for black and white negative film and silver prints, medical X-ray materials, and materials used in graphic arts and lithographic applications. Processes can be used which produce dye images. These include but are not limited to, the C-41, E-6, RA-4, EP-2, ECN-2 and ECP-2A processes of the Eastman Kodak Company. Useful processes which produce dye images can produce negative or positive color images, or can produce monochrome dye images.

The invention is further illustrated by the following examples, without being limited thereby.

EXAMPLE 1

The synthesis of bleach accelerator monomer 1 (S-(2-(4-morpholino)ethyl) 1-(4-vinylbenzyl)-2-cyclohexanone thiocarboxylate) is outlined below.

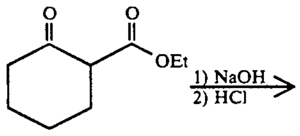

(A)

-continued

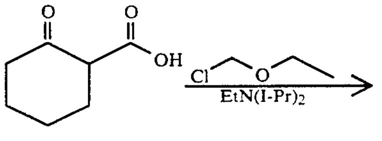

(B)

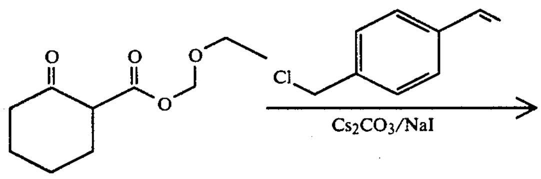

(C)

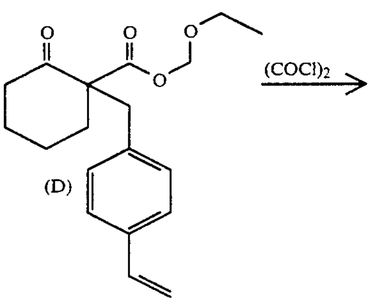

(D)

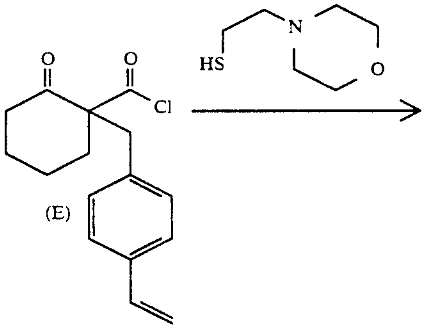

(E)

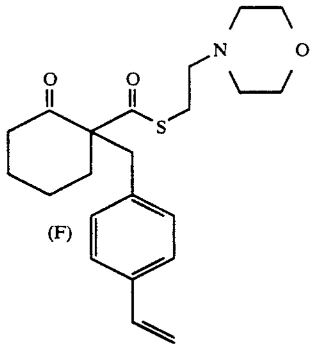

(F)

Ethyl 2-cyclohexanone carboxylate (A) (75 g) was stirred at room temperature with 587 mL 1N NaOH, until a clear solution was obtained (90 minutes). A saturated solution of NaCl (100 ml) was added, the mixture was cooled to 0° C., and 12 N HCl (60 mL) was added dropwise. The mixture was stirred for 30 minutes at 0° C., and the solid product (B) was collected on a filter and dried in a stream of air for 30 minutes. Yield 45.6 g (73%).

The carboxylate (B) (89.7 g) was combined under $N_2$ atmosphere with $CH_2Cl_2$ in a 3 L flask fitted with a mechanical stirrer, thermometer, addition funnel, and dry-ice condenser. The mixture was cooled below −20° C., and ethyldiisopropylamine (114 mL) was added, followed by dropwise addition of chloromethyl ethyl ether (64 mL) over a period of 30 minutes. The mixture was stirred an additional 30 minutes and was allowed to warm to room temperature. The reaction mixture was washed with 3×250 mL 0.1 N HCl, dried over $Na_2SO_4$ and evaporated under vacuum to yield ester (C) as an oil. Yield 99.1 g (78%).

The ester (C) (30.0 g), p-vinylbenzyl chloride (22.9 g), powdered $Cs_2CO_3$ (58.7 g), powdered KI (5.0 g), pyrogallol (0.090 g) and acetone (300 mL) were combined in a 500 mL flask fitted with a condenser and magnetic stirrer. The mixture was heated to reflux for 20 h. The mixture was cooled, diethyl ether (300 mL) was added, the solution was filtered, and the solvent was evaporated under vacuum to yield a pale yellow oil. $^1H$ NMR ($CDCl_3$, 300 MHz) showed the product (D), and about 1.5% acetone (by weight) as the major impurity, Yield 47.7 g (approx. 100%).

The ester (D) (16.0 g), $CH_2Cl_2$ (80 mL), oxalyl chloride (20 mL) and N,N-dimethylformamide (0.012 mL) were combined in a 200 mL flask and stirred at room temperature for 20 h. The mixture was evaporated under vacuum, 40 mL additional $CH_2Cl_2$ was added, and the mixture was again evaporated to yield a light brown oil. $^1H$ NMR ($CDCl_3$, 300 MHz) showed complete conversion of ester (D) to acid chloride (E). $CH_2Cl_2$ (100 mL) was added, and the mixture was cooled to 0° C. under an atmosphere of $N_2$. 2-(4-morpholino)ethanethiol (6.56 g) was added all at once. The mixture was allowed to warm to room temperature, and was stirred for 24 h. The mixture was washed with 160 mL 0.5 N NaOH, the organic phase was dried over $Na_2SO_4$ and was evaporated to yield a dark brown oil. Purification by column chromatography (silica, eluted with a gradient 100:0→70:30 $CH_2Cl_2$: ethyl ether) followed by evaporation of the solvent of the product-containing fractions yielded the thiocarboxylate (F) (monomer 1) as a pale yellow oil. $^1H$ NMR was consistent with the structure of (F), with a trace of $CH_2Cl_2$ as the major impurity. Yield 13.6 g (70%) based on the ethoxymethyl ester (D).

EXAMPLE 2

Using monomer 1, four copolymer structures were prepared, as shown below. Polymers 1-1, 1-2 and 1-3 are aqueous solution polymers. Polymer 1-4 is a latex polymer. The solution polymers are zwitterionic, with a net anionic charge. In general, because of the anionic surfactants used in coating, anionic polymers are more compatible with the process of coating photographic layers.

The polymers cover a fairly broad range of hydrophobicity/hydrophilicity, with 1-3 as the most hydrophilic, followed by less hydrophilic compositions 1-1 and 1-2. The latex polymer 1-4, which is the most hydrophobic of the materials, contains a p-toluenesulfonate counterion to the morpholinium moiety, and sufficient carboxylic acid functionality to become anionic at the pH of the processing solution. This can enhance the chemical reactivity of the polymer in processing compared to a latex containing no carboxylic acid.

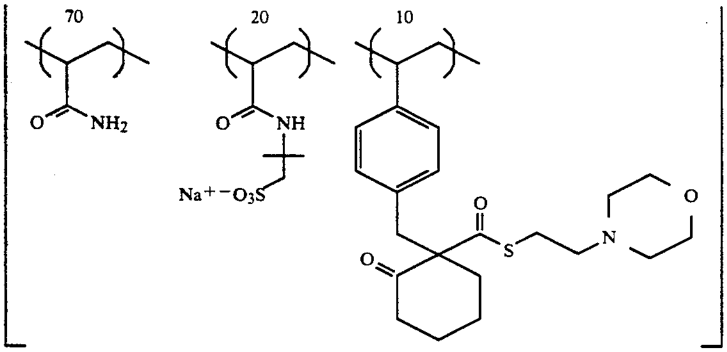

1-1

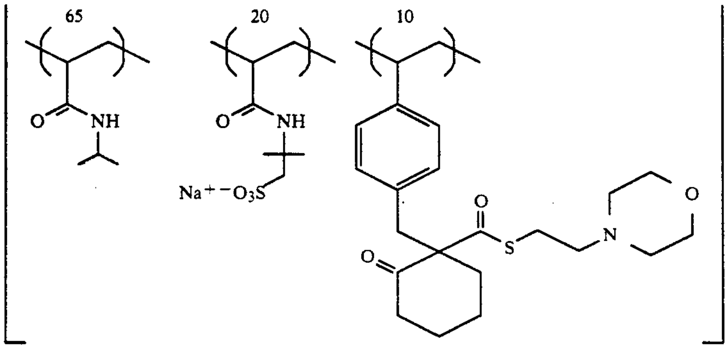

1-2

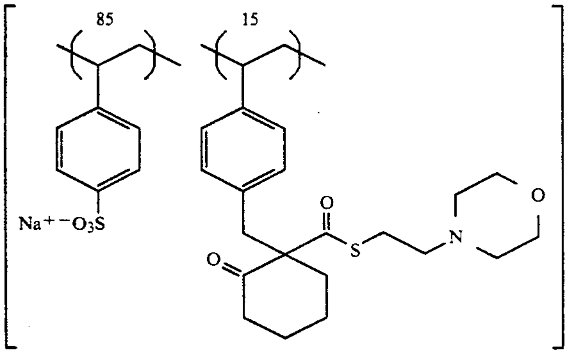

1-3

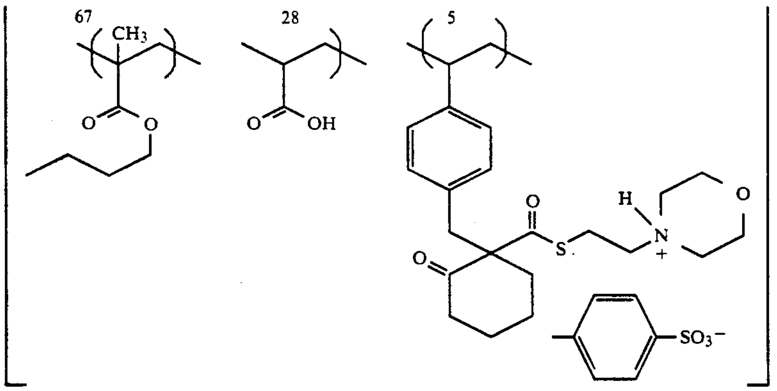

1-4

Preparation of Polymers 1-1 to 1-4 a) Polymer 1-1: Acrylamide (0.75 g), sodium 2-acrylamido-2-methylpropanesulfonate (0.69 g) and monomer 1 (0.58 g) were combined in a sealable vial equipped with a magnetic stirrer. To the monomers was added water (7.5 mL), methanol (3.5 mL), 1.0 N HCl (1.5 mL) and 4,4'-azobis(4-cyanovaleric acid) (0.55 g, 75%, with water as the impurity). The vial was purged with $N_2$, sealed, and heated to 64° C. for 16 hours, yielding a turbid, viscous solution. To the solution was added 1.0 N NaOH (1.5 mL), and the resulting clear viscous solution was added slowly to rapidly stirred isopropyl alcohol (250 mL). The precipitate was isolated by filtration, washed with 2×100 mL isopropyl alcohol, and vacuum dried to yield the polymer as a white solid. $^1H$ NMR (300 MHz, $D_2O$) showed broad signals consistent with the proposed polymer structure, and well resolved signals corresponding to approx. 3.6 wt % of retained isopropyl alcohol. Yield 1.55 g, approx. 96% pure by weight, 75% yield. Inherent viscosity=1.02 (0.1 N NaCl, c=0.251). The polymer was redissolved in water to prepare a 5% solution for photographic evaluation.

b) Polymer 1-2: N-Isopropylacrylamide (0.67 g), sodium 2-acrylamido-2-methylpropanesulfonate (0.57 g) and monomer 1 (0.58 g) were combined in a sealable vial equipped with a magnetic stirrer. To the monomers was added water (4.5 mL), methanol (5.5 mL), 1.0 N HCl (1.5 mL) and 4,4'-azobis(4-cyanovaleric acid) (0.037 g, 75% pure). The vial was purged with $N_2$, sealed, and heated to 64° C. for 40 hours, yielding a two-phase viscous liquid mixture. To the solution was added 1.0 N NaOH (1.5 mL), and the resulting clear, viscous solution was dialyzed for 8 h (10,000 MW cutoff), yielding a clear solution (36.5 g), 4.3% solids (86% yield). $^1H$ NMR (300 MHz, DMSO-dG) of a freeze-dried sample showed broad signals consistent with the proposed polymer structure. Inherent viscosity=0.25 (0.1 N LiCl/methanol, c=0.254).

c) Polymer 1-3: Sodium p-styrenesulfonate (1.75 g) and monomer 1 (0.58 g) were combined in a sealable vial equipped with a magnetic stirrer. To the monomers was added water (5.0 mL), methanol (8.5 mL), 1.0 N HCl (1.5 mL) and 4,4'-azobis(4-cyanovaleric acid) (0.037 g, 75% pure). The vial was purged with $N_2$, sealed, and heated to 64° C. for 16 hours, yielding a clear viscous solution which became turbid after cooling. To the solution was added 1.0 N NaOH (1.5 mL), and the resulting clear, viscous solution was added slowly to rapidly stirred isopropyl alcohol (250 mL). The precipitate was isolated by filtration, washed with 2×100 mL isopropyl alchol, and vacuum dried to yield the polymer as a white solid. $^1H$ NMR (300 MHz, $D_2O$) showed broad signals consistent with the proposed polymer structure, and well-resolved signals corresponding to approx. 4 wt % of retained isopropyl alcohol. Yield 2.04 g, approx. 96% pure by weight, 87% yield. Inherent viscosity=0.25 (0.1 N NaCl, c=0.256). The polymer was redissolved in water to prepare a 5% solution for photographic evaluation.

d) Polymer 1-4: In a 200 mL flask under $N_2$ atmosphere, magnetically stirred in a 64° C. bath, were combined water (40 mL), nonionic surfactant (Olin 10G, 0.30 g of 50% solution), methanol (4.0 mL) and 4,4'-azobis(4-cyanovaleric acid) (0.040 g, 75% pure). A monomer solution was prepared by combining butyl methacrylate (2.1 g), acrylic acid (0.45 g), monomer 1, (0.45 g) p-toluenesulfonic acid hydrate (0.22 g), nonionic surfactant (Olin 10G, 0.30 g of 50% solution), and methanol (6.0 mL). The monomer solution was added dropwise over 1 h to the stirred, heated aqueous mixture. The resulting white latex was stirred at 64° C. for 1 h, and was then cooled, filtered to remove a small amount of precipitate, and dialyzed for 10 h (10,000 MW cutoff). Yield 73.5 g latex, 3.67% solids (84% yield). $^1H$ NMR (300 MHz, $CDCl_3$) of a freeze-dried sample was consistent with the proposed polymer structure. Inherent viscosity=0.80 ($CH_2Cl_2$, c=0.244).

EXAMPLE 3

Photographic Evaluation

Polymers 1-1 to 1-4 were added, as aqueous solutions or aqueous latex, to the melts used to prepare Layer 1 of the experimental monochrome shown in FIG. 1. All of these materials were added directly to coating solutions for evaluation, with no dispersion preparation. The test polymers were coated at 53.8 or 107.6 μmol/m². The emulsion used was a 3 mole % iodide, tabular grain emulsion with average grain size 0.75 μm diameter and 0.13 μm thickness, red-sensitized.

| | |
|---|---|
| DOC (Layer 2) | Gelatin (5.38 g/m²)<br>1,1'-(oxybis(methylenesulfonyl))bis-ethene (2% of total gelatin) hardener<br>saponin (1.5% melt volume) |
| EMULSION LAYER (Layer 1) | Gelatin (3.23 g.m²)<br>Coupler C-2 (0.75 g/m²)<br>Coupler C-3 (0.05 g/m²)<br>Emulsion (1.61 g Ag/m²)<br>saponin (1.5% melt volume)<br>+/− polymer |
| SUPPORT | Remjet filmbase |

FIG. 1

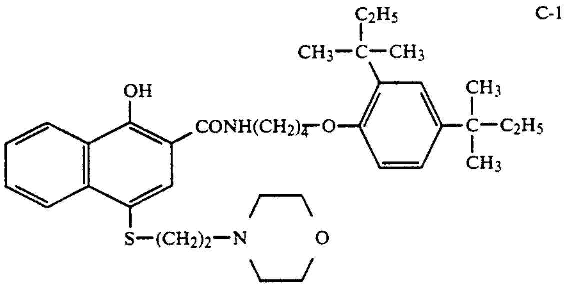

C-1

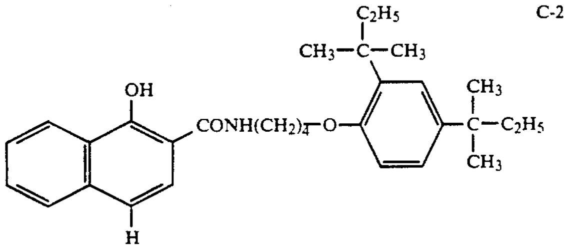

C-2

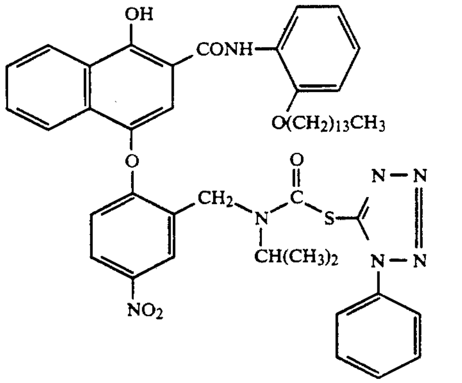

C-3

Samples of each experimental monochrome coating were imagewise exposed through a graduated-density test object and processed at 100° F. employing one of the following developing solutions, then stopped, bleached, fixed, washed and dried to produce stepped density cyan dye images.

| | | |
|---|---|---|
| Water to 1L (approx. 800 ml) | | |
| Developer I: | | |
| Potassium carbonate, anhydrous | 34.30 | g |
| Potassium bicarbonate | 2.32 | g |
| Sodium sulfite, anhydrous | 0.38 | g |
| Sodium metabisulfite | 2.78 | g |
| Potassium iodide | 0.001 | g |
| Sodium bromide | 1.31 | g |
| Diethylenetriaminepentaacetic acid pentasodium salt (KODAK anti-calcium No. 8) | 8.43 | g |
| Hydroxylamine sulfate | 2.41 | g |
| KODAK Color Developing Agent CD-4 | 4.52 | g |
| Developer II: | | |
| Potassium carbonate | 30.00 | g |
| Potassium sulfite | 2.00 | g |
| Potassium iodide | 0.006 | g |
| Potassium bromide | 1.25 | g |
| Sulfuric acid | 2.0 | ml |
| KODAK Color Developing Agent CD-4 | 3.35 | g |

Two development protocols were used to process these coatings, using developer I containing 2.41 g/L hydroxylamine sulfate, and developer II containing no hydroxylamine.

Coatings were processed according to one of the following processes:

| | |
|---|---|
| Developer I or II | 3.25 min, $N_2$ agitation |
| ECN stop bath | 0.5 min, $N_2$ agitation |
| wash | 2.0 min |
| Flexicolor II Bleach | 3.0 min, air agitation |
| wash | 3.0 min |
| C41 Fix Replenisher | 4.0 min, $N_2$ agitation |
| wash | 3.0 min |
| Photoflo | 0.5 min |

The timely release of bleach accelerating fragments (BAs) in the monochrome testing format, containing development inhibitor anchimerically releasing (DIAR) coupler, leads to gamma rises compared to check coating containing no bleach accelerator releasers. In Table 1, release of the BA, morpholinoethanethiol, from polymers 1-1 to 1-4 is compared to imagewise release of BA from the coupler C-1. Table 1 shows the changes in contrast (defined as the maximum slope between any two density points which are two steps apart) seen versus a check coating containing no BA releaser.

TABLE 1

| | Polymer | | | | | | | | | |
|---|---|---|---|---|---|---|---|---|---|---|
| | 1-1 | | 1-2 | | 1-3 | | 1-4 | | C-1 | |
| Laydown (μmol/$m^2$) | 53.8 | 107.6 | 53.8 | 107.6 | 53.8 | 107.6 | 53.8 | 107.6 | 53.8 | 107.6 |
| Δγ dev. I | +0.26 | +0.44 | +0.25 | +0.28 | +0.45 | +0.61 | +0.08 | +0.27 | −0.11 | +0.25 |
| Δγ dev. II | −0.09 | −0.07 | −0.08 | −0.12 | −0.06 | −0.00 | −0.07 | −0.05 | +0.14 | +0.24 |

For polymer 1-1 to 1-4, contrast increased when strips were processed through the hydroxylamine-containing developer I, but did not when strips were processed through developer II containing no hydroxylamine. Use of coupler C-1 gave imagewise release in both developers.

EXAMPLE 3

Bleaching Efficiency

Coatings containing polymers 1-1 to 1-4, coupler C-1 and checks were given a room, white light exposure to generate a large quantity of developable silver. They were then processed through developer I or II (3.25 min), stopped (0.5 min), washed, and bleached using persulfate bleach as detailed below for zero, 0.5, 1.0 or 3.0 minutes. The percentage of the silver remaining in a coating after bleaching compared to the amount in the coating given zero time of bleach was determined by x-ray fluorescence and is given in Table 2. The composition of the bleach is given below:

| Composition of Persulfate Bleach | | |
|---|---|---|
| For 1 L | | |
| Gelatin | 0.5 | g |
| Sodium persulfate | 33 | g |
| Sodium chloride | 15 | g |
| Sodium dihydrogen phosphate | 15 | g |
| Water | 9 | g |
| pH = 2.3 (adjusted with phosphoric acid) | 800 | ml (to 1 L) |

TABLE 2

| | | Time of Bleach Data | | | | | |
|---|---|---|---|---|---|---|---|
| | | % silver remaining | | | | | |
| B.A. | Laydown | Developer II | | | Developer I | | |
| Realeaser | (μmol/$m^2$) | 0.5 min | 1.0 min | 3.0 min | 0.5 min | 1.0 min | 3.0 min |
| C-1 | 53.8 | 87 | 79 | 58 | 90 | 82 | 69 |
| | 107.6 | 66 | 47 | 25 | 72 | 59 | 36 |
| 1-1 | 53.8 | 104 | 100 | 89 | 94 | 83 | 62 |
| | 107.6 | 96 | 94 | 90 | 69 | 55 | 32 |
| 1-2 | 53.8 | 105 | 98 | 96 | 83 | 76 | 55 |
| | 107.6 | 103 | 96 | 92 | 68 | 53 | 29 |
| 1-3 | 53.8 | 100 | 97 | 92 | 65 | 50 | 33 |
| | 107.6 | 108 | 100 | 104 | 18 | 20 | 7 |
| 1-4 | 53.8 | 97 | 94 | 86 | 97 | 89 | 76 |
| | 107.6 | 102 | 99 | 94 | 84 | 71 | 50 |
| Check 1 | — | 99 | 98 | 97 | 99 | 97 | 94 |
| Check 2 | — | 102 | 101 | 93 | 108 | 106 | 104 |

Bleach acceleration was seen in strips containing polymers 1-1 to 1-4 when processed through developer I. Little extra bleaching vs. the checks was seen in strips processed through developer II. The more hydrophilic polymer (such as polymer 1-3) gave more bleach acceleration.

EXAMPLE 4

Bleaching in Multilayer Coatings

On a transparent cellulose triacetate support were coated layers described below in this order to prepare a light-sensitive element.

(I) Antihalation layer containing 0.44 g/$m^2$ of grey silver and 2.47 g/$m^2$ of gelatin.

(II) Interlayer containing 0.62 g/$m^2$ of gelatin.

(III) Red-sensitive layer containing a red-sensitive silver bromoiodide emulsion (containing 0.60 g/$m^2$ of silver), 0.20 g/$m^2$ of cyan coupler C-4, 0.035 g/$m^2$ of Dox scavenger DOX-1, 0.10 g/$m^2$ of solvent-2 and 0.87 of g/$m^2$ gelatin.

(IV) Red-sensitive layer containing a red-sensitive silver bromoiodide emulsion (containing 0.55 g/$m^2$ of silver), 0.98 g/$m^2$ of cyan coupler C-4, 0.49 g/$m^2$ of solvent-2 and 1.53 g/$m^2$ of gelatin.

(V) Interlayer containing 0.22 g/$m^2$ of DOX scavenger DOX-1, 0.07 g/$m^2$ of magenta dye DYE-1 and 0.62 g/$m^2$ of gelatin.

(VI) Green-sensitive layer containing a green-sensitive silver bromoiodide emulsion (containing 0.60 g/$m^2$ of silver), 0.15 g/$m^2$ of magenta coupler C-5, 0.07 g/$m^2$ of magenta coupler C-6, 0.11 g/$m^2$ of solvent-1 and 0.87 g/$m^2$ of gelatin.

(VII) Green-sensitive layer containing a green-sensitive silver bromoiodide emulsion (containing 0.49 g/$m^2$ of silver), 0.61 g/$m^2$ of magenta coupler C-5, 0.26 g/$m^2$ of magenta coupler C-6, 0.44 g/$m^2$ of solvent-1 and 1.53 g/$m^2$ gelatin.

(VIII) Interlayer containing 0.22 g/$m^2$ of Dox scavenger DOX-1, 0.27 g/$m^2$ of yellow dye DYE-2 and 0.62 g/$m^2$ of gelatin.

(IX) Blue-sensitive layer containing a blue-sensitive silver bromoiodide emulsion (containing 0.44 g/$m^2$ of silver), 0.20 g/$m^2$ of yellow coupler C-7, 0.05 g/$m^2$ of Dox scavenger DOX/2, 0.07 g/$m^2$ of solvent-2 and 0.87 g/$m^2$ of gelatin.

(X) Blue-sensitive layer containing a blue-sensitive silver bromoiodide emulsion (containing 0.55 g/$m^2$ of silver), 1.58 g/$m^2$ of yellow coupler C-7, 053 g/$m^2$ of solvent-2 and 2.40 g/$m^2$ of gelatin.

(XI) Ultraviolet ray absorbing layer containing 0.07 g/$m^2$ of Dox scavenger DOX-2, 0.38 g/$m^2$ of UV dye UV-1, 0.07 g/$m^2$ of UV dye UV-2, 0.13 g/$m^2$ of UV dye UV-3, 0.65 g/$m^2$ of polymeric solvent LATEX-1 and 1.42 g/$m^2$ of gelatin.

(XII) Protective layer containing 0.31 g/$m^2$ of gelatin crosslinking agent HAR-1 and 1.00 g/$m^2$ of gelatin.

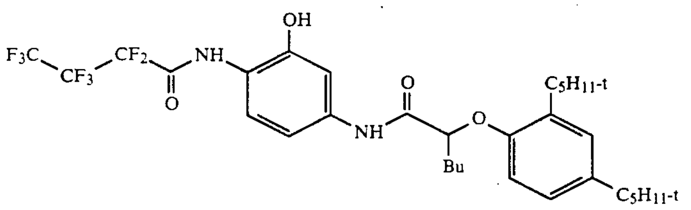

C-4

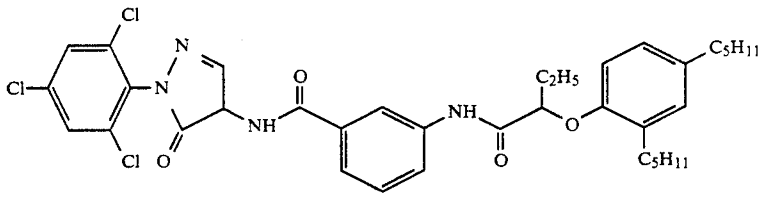

C-5

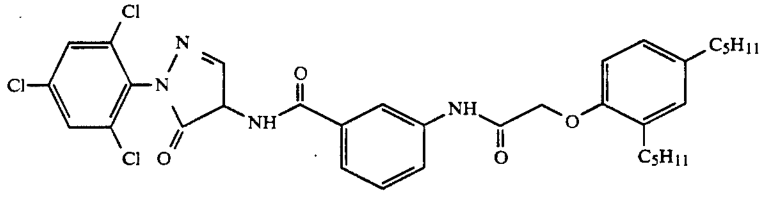

C-6

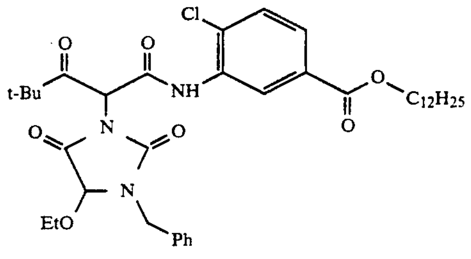

C-7

-continued
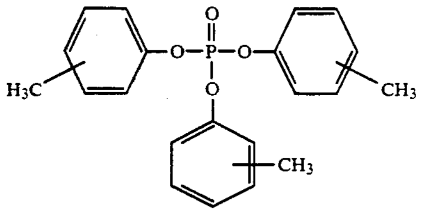
Solvent-1
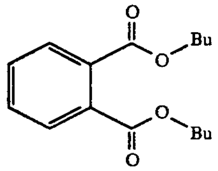
Solvent-2
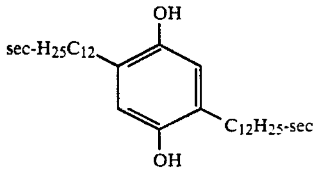
DOX-1
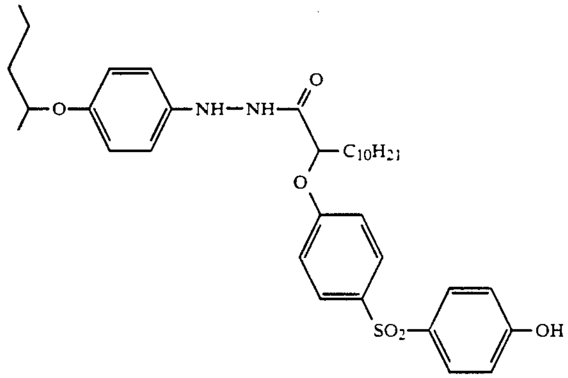
DOX-2
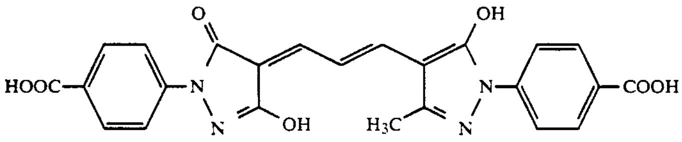
DYE-1
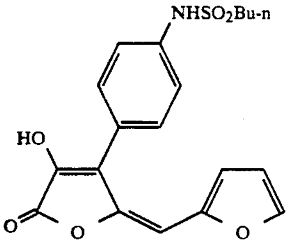
DYE-2
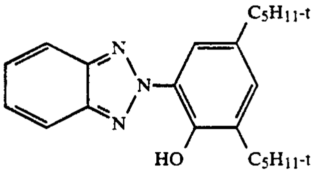
UV-1

-continued

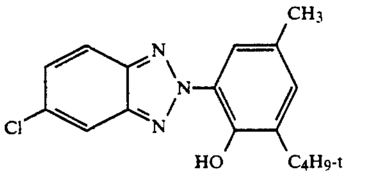

UV-2

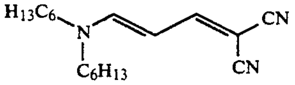

UV-3

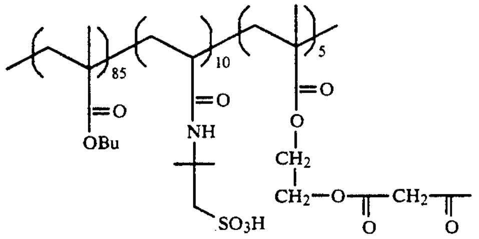

LATEX-1

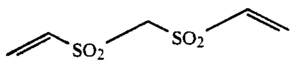

HAR-1

Polymers 1-1 to 1-4 were included in the above coatings in either the interlayer (II) or the red-sensitive layer (III). The polymers were added at 107.6 mmol/m$^2$ or 215.2 mmol/m$^2$.

The coatings were given a room, white light exposure, processed through developer I (3.25 min), stopped (0.5 min), washed, then bleached using SR31 persulfate bleach for zero, 3.0 or 6.0 minutes. The unbleached coatings contained a total approximately 3.70 g Ag/m$^2$.

The percent silver remaining for bleached coatings versus the unbleached coating were determined and are shown in Table 3.

TABLE 3

| B.A. Releaser | Laydown (μmol/m$^2$) | % silver remaining 1.0 min | 3.0 min | 6.0 min |
|---|---|---|---|---|
| a) polymers 1-1 to 1-4 included in Layer (III) | | | | |
| 1-1 | 107.6 | 64 | 49 | 40 |
| 1-2 | 107.6 | 70 | 51 | 45 |
| 1-3 | 107.6 | 46 | 34 | 29 |
| 1-4 | 107.6 | 82 | 67 | 58 |
| check | — | 97 | 94 | 84 |
| b) polymers 1-1 to 1-4 included in Layer (II) | | | | |
| 1-1 | 107.6 | 55 | 43 | 35 |
| | 215.2 | 33 | 25 | 21 |
| 1-2 | 107.6 | 60 | 45 | 40 |
| | 215.2 | 40 | 30 | 24 |
| 1-3 | 107.6 | 41 | 32 | 26 |
| | 215.2 | 32 | 24 | 21 |
| 1-4 | 107.6 | 83 | 67 | 58 |
| | 215.2 | 67 | 52 | 43 |
| check | — | 97 | 94 | 84 |

The inventive polymers are effective bleach accelerator releasers. The amount of acceleration increases with laydown and with polymer hydrophilicity. The placement of the polymer has an influence on its effectiveness.

It is apparent that these polymers are unusual in that they do not release the PUG even during processing in the absence of a suitable dinucleophile.

EXAMPLE 5

Samples prepared in example 4 were also exposed using a 21 step table ranging from 0 to 3.0 density in steps of 0.15 with a 5500 K illuminant for 1/50 seconds. All of the exposed samples were processed through a variety of experimental color reversal processing procedures using experimental solutions as described below.

| Color Reversal Process (98.4° F.) | |
|---|---|
| First Developer | (6 min.) |
| Wash | (2 min.) |
| Reversal Bath | (2 min.) |
| Color Developer | (6 min.) |
| Conditioner | (2 min.) |
| Bleach | (6 min.) |
| Fix | (2 min.) |
| Wash | (1 min.) |
| Stabilizer | (1 min.) |

| | | |
|---|---|---|
| First Developer | | |
| Water | 600.0 | ml |
| Aminotris (methylenephosphonic acid), pentasodium salt, 40% solution | 1.41 | g |
| Diethyleetriaminepentaacetic acid pentasodium salt, 40% solution | 6.26 | g |
| Potassium sulfite, 45% solution | 66.10 | g |
| Sodium bromide (anhydrous) | 2.34 | g |
| Sodium thiocyanate | 1.00 | g |
| Potassium iodide (anhydrous) | 4.5 | mg |
| 4-Hydroxymethyl-4-methyl-1-phenyl-3-pyrazolidinone | 1.5 | mg |
| Potassium carbonate (anhydrous) | 14.00 | g |
| Sodium bicarbonate (anhydrous) | 12.00 | g |
| Potassium hydroquinone sulfonate | 23.40 | g |
| Acetic acid | 0.58 | g |
| Water to make | 1.005 | L |
| pH @ 80 F 9.60 +/− 0.05 | | |
| Reversal Bath | | |
| Water | 600.0 | ml |
| Propionic acid | 11.90 | g |
| Stannous chloride (anhydrous) | 1.65 | g |
| p-Aminophenol | 0.50 | mg |
| Sodium hydroxide, 50% solution | 9.92 | g |
| Aminotris (methylenephosphonic acid), pentasodium salt, 40% solution | 21.10 | g |
| Hyamine 1622, 50% solution | 10.00 | mg |
| Water to make | 1.00 | L |
| pH @ 80 F 5.75 +/− 0.05 | | |

-continued

| Color Reversal Process (98.4° F.) | |
|---|---|
| Color Developer | |
| Water | 800.0 ml |
| Aminotris (methylenephosphonic acid), pentasodium salt, 40% solution | 6.68 g |
| Phosphoric acid, 75% solution | 17.40 g |
| Sodium bromide (anhydrous) | 0.65 g |
| Potassium iodide (anhydrous) | 37.50 mg |
| Potassium hydroxide, 45% solution | 61.60 g |
| Sodium sulfite (anhydrous) | 6.08 g |
| Sodium metabisulfite | 0.50 g |
| Citrazinic acid | 0.57 g |
| KODAK Color Developing Agent CD-3 | 10.42 g |
| 2,2'-(Ethylenedithio) diethanol (3,6-dithia-1,8-octanediol) | 0.87 g |
| Acetic acid | 1.16 g |
| Sodium carboxymethylcellulose 7LF (Hercules) | 0.95 g |
| Sodium carboxymethylcellulose 7H3SF (Hercules) | 0.71 g |
| Water to make | 1.005 L |
| pH @ 80 F 11.75 +/− 0.05 | |
| Conditioner | |
| Water | 800.0 ml |
| Hydroxylamine Sulfate | 40 g or 80 g |
| Water to make | 1.00 L |
| Bleach | |
| Water | 800.0 ml |
| Gelatin | 0.50 g |
| Sodium persulfate | 33.00 g |
| Sodium chloride | 15.00 g |
| Sodium dihydrogen phosphate (anhydrous) | 9.00 g |
| Water to make | 1.00 L |
| pH @ 80 F 2.30 +/− 0.20 Adjusted with phosphoric acid | |
| Fixer | |
| Water | 500.0 ml |
| Ammonium thiosulfate (56.5% ammonium thiosulfate, 4% ammonium sulfite) | 124.70 g |
| (Ethylenedinitrilo) tetraacetic acid | 0.59 g |
| Sodium metabisulfite | 7.12 g |
| Sodium hydroxidem 50% solution | 2.00 g |
| Water to make | 1.00 L |
| pH @ 80 F 6.60 +/− 0.10 | |
| Stabilizer | |

-continued

| Color Reversal Process (98.4° F.) | |
|---|---|
| Water | 900.0 ml |
| RENEX 30 (ICI United States) (polyoxethylene 12 tridecyl alcohol) | 0.14 g |
| Formaldehyde (37% solution, 12% Methanol) | 6.50 g |
| Water to make | 1.00 L |

In these experimental color reversal processes, sodium persulfate was used in the bleach solution. A dinucleophile hydroxylamine sulfate (HAS) solution at the concentration of 4 or 8 g/liter was used as the conditioner prior to the bleach solution. The pH of the conditioner was adjusted to pH 6 or 10 by NaOH or HCl solutions as needed. For comparison, a process was carried out using 5% acetic acid solution without any dinucleophile as conditioner. The remaining silver at each exposure step for each coating after processing was determined by X-ray fluorescence, and the highest residual silver for each coating was recorded in Tables 4 and 5.

TABLE 4

Polymers 1-1 to 1-4 were included in layer II.

| | | Residual Silver (g/m²) in coatings using different conditions | | | | |
|---|---|---|---|---|---|---|
| B.A. Releaser | Laydown (μmole/m²) | HAS @ 4 g/liter pH 6 | HAS @ 8 g/liter pH 6 | HAS @ 4 g/liter pH 10 | HAS @ 8 g/liter pH 10 | 5% Acetic Acid |
| none | — | 3.39 | 3.44 | 3.29 | 3.30 | 3.61 |
| 1-1 | 108 | 1.97 | 1.56 | 1.83 | 1.72 | 3.13 |
| 1-1 | 215 | 1.60 | 1.46 | 1.22 | 1.04 | 2.71 |
| 1-2 | 108 | 2.10 | 1.93 | 1.74 | 1.62 | 3.38 |
| 1-2 | 215 | 1.67 | 1.96 | 1.30 | 0.92 | 3.15 |
| 1-3 | 108 | 1.65 | 1.59 | 1.49 | 1.46 | 3.38 |
| 1-3 | 215 | 1.17 | 1.09 | 1.04 | 0.98 | 3.34 |
| 1-4 | 108 | 2.46 | 2.42 | 2.21 | 1.99 | 3.49 |
| 1-4 | 215 | 2.03 | 2.13 | 1.84 | 1.69 | 3.30 |

TABLE 5

Polymers 1-1 to 1-4 were included in layer III.

| | | Residual Silver (g/m²) in coatings using different conditioners | | | | |
|---|---|---|---|---|---|---|
| B.A. Releaser | Laydown (μmole/m²) | HAS @ 4 g/liter pH 6 | HAS @ 8 g/liter pH 6 | HAS @ 4 g/liter pH 10 | HAS @ 8 g/liter pH 10 | 5% Acetic Acid |
| none | — | 3.39 | 3.44 | 3.29 | 3.30 | 3.61 |
| 1-1 | 108 | 2.06 | 1.98 | 1.84 | 1.72 | 3.25 |
| 1-2 | 108 | 2.03 | 1.86 | 1.79 | 1.59 | 3.29 |
| 1-3 | 108 | 1.64 | 1.61 | 1.84 | 1.48 | 3.52 |
| 1-4 | 108 | 2.46 | 2.41 | 2.22 | 2.06 | 3.34 |

As shown in the tables above, the coating that did not contain any bleach accelerator polymer had very high silver retention after process. The inventive polymers effectively released bleach accelerator by reaction with the dinucleophile hydroxylamine in the processing solutions (as indicated by the lower residual silver), and the pH of the solution did not affect the releasing efficiency noticeably. The amount of acceleration increases with laydown and with hydrophilicity of the polymer.

EXAMPLE 6

On a transparent cellulose triacetate support were coated layers described below in this order to prepare a light-sensitive element.

(I) Antihalation layer containing 0.44 $g/m^2$ of grey silver and 2.47 $g/m^2$ of gelatin.

(II) Interlayer containing 0.76 $g/m^2$ of gelatin.

(III) Red-sensitive layer containing a red-sensitive silver bromoiodide emulsion (containing 0.60 $g/m^2$ of silver), 0.20 $g/m^2$ of cyan coupler C-4, 0.03 $g/m^2$ of Dox scavenger DOX-1, 0.10 $g/m^2$ of solvent-2 and 0.87 of $g/m^2$ gelatin.

(IV) Red-sensitive layer containing a red-sensitive silver bromoiodide emulsion (containing 0.55 $g/m^2$ of silver), 0.98 $g/m^2$ of cyan coupler C-4, 0.49 of solvent-2 and 1.53 $g/m^2$ of gelatin.

(V) Interlayer containing 0.76 $g/m^2$ of gelatin.

(VI) Interlayer containing 0.22 $g/m^2$ of Dox scavenger DOX-1, 0.07 $g/m^2$ magenta dye DYE-1 and 0.62 $g/m^2$ of gelatin.

(VII) Green-sensitive layer containing a green-sensitive silver bromoiodide emulsion (containing 0.60 $g/m^2$ of silver), 0.15 $g/m^2$ of magenta coupler C-5, 0.07 $g/m^2$ of magenta coupler C-6, 0.11 $g/m^2$ of solvent-1 and 0.87 $g/m^2$ of gelatin.

(VIII) Green-sensitive layer containing a green-sensitive silver bromoiodide emulsion (containing 0.49 $g/m^2$ of silver), 0.61 $g/m^2$ of magenta coupler C-5, 0.26 $g/m^2$ of magenta coupler C-6, 0.44 $g/m^2$ of solvent-1 and 1.53 $g/m^2$ of gelatin.

(IX) Interlayer containing 0.76 $g/m^2$ of gelatin.

(X) Interlayer containing 0.22 $g/m^2$ of Dox scavenger DOX-1, 0.27 $g/m^2$ yellow dye DYE-2 and 0.62 $g/m^2$ of gelatin.

(XI) Blue-sensitive layer containing a blue-sensitive silver bromoiodide emulsion (containing 0.44 $g/m^2$ of silver), 0.20 $g/m^2$ of yellow coupler C-7, 0.05 $g/m^2$ of Dox scavenger DOX-2, 0.07 $g/m^2$ of solvent-2 and 0.87 $g/m^2$ of gelatin.

(XII) Blue-sensitive layer containing a blue-sensitive silver bromoiodide emulsion (containing 0.55 $g/m^2$ of silver), 1.58 $g/m^2$ of yellow coupler C-7, 0.53 $g/m^2$ of solvent-2 and 2.40 $g/m^2$ of gelatin.

(XIII) Ultraviolet ray absorbing layer containing 0.07 $g/m^2$ of Dox scavenger DOX-2, 0.38 $g/m^2$ of UV dye UV-1, 0.07 $g/m^2$ of UV dye UV-2, 0.13 $g/m^2$ of UV dye UV-3, 0.65 $g/m^2$ of polymeric solvent LATEX-1 and 1.42 $g/m^2$ of gelatin.

(XIV) Protective layer containing 0.33 $g/m^2$ of gelatin crosslinking agent HAR-1 and 1.00 $g/m^2$ of gelatin.

Polymer 1-4 was incorporated in one or more layers at various laydown in the multilayer as follows:

| | |
|---|---|
| sample A | no polymer incorporated in any layer |
| sample B | 0.61 $g/m^2$ in layer II |
| sample C | 0.46 $g/m^2$ in layer II |
| sample D | 0.41 $g/m^2$ in layer II and 0.20 $g/m^2$ in layer IX |
| sample E | 0.31 $g/m^2$ in layer II and 0.15 $g/m^2$ in layer IX |
| sample F | 0.15 $g/m^2$ in layer II, 0.15 $g/m^2$ in layer IV and 0.15 $g/m^2$ in layer IX |
| sample G | 0.20 $g/m^2$ in layer II, 0.2 $g/m^2$ in layer IV and 0.20 $g/m^2$ in layer IX |
| sample H | 0.61 $g/m^2$ in layer IX |
| sample I | 0.20 $g/m^2$ in layer VII and 0.20 $g/m^2$ in layer XI |

Coatings were exposed and processed the same ways as described in example 5. In addition to the processes using hydroxylamine sulfate in the conditioner, one process that adding HAS in color developer at the concentration of 4 g/liter followed by 5% acetic acid conditioner was also explored. The residual silver data (details described in example 5) is given in Table 6.

TABLE 6

| | Residual Silver ($g/m^2$) in coatings from different experimental processes | | | |
|---|---|---|---|---|
| | Color Dev. | | | |
| | no HAS | no HAS | no HAS | w/ HAS @ 4/ g/liter |
| | Conditioner | | | |
| | 5% Acetic acid | HAS @ 4/liter pH 6 | HAS @ 4/liter pH 3 | 5% Acetic acid |
| sample A | 3.46 | 2.22 | 2.57 | 2.32 |
| sample B | 3.07 | 0.36 | 0.61 | 0.22 |
| sample C | 3.18 | 0.37 | 0.79 | 0.29 |
| sample D | 3.21 | 0.25 | 0.70 | 0.31 |
| sample E | 3.10 | 0.09 | 0.50 | 0.12 |
| sample F | 3.10 | 0.05 | 0.23 | 0.10 |
| sample G | 3.08 | 0.21 | 0.43 | 0.12 |
| sample H | 3.22 | 0.16 | 0.53 | 0.13 |
| sample I | 3.58 | 0.24 | 0.38 | 0.10 |

As shown in Table 6, the silver bleaching was improved significantly by incorporation of the invention polymer in the multilayer structure. The amount of acceleration depends not only on the laydown of the inventive polymer but more importantly also on the placement thereof. It is also very unexpected and advantageous that release of bleach accelerator from the polymer occurs rapidly even at a pH as low as 3 in the presence of hydroxylamine as the dinucleophile. This contrasts with the reactivity of some low-molecular weight compounds, which require alkaline conditions for release of the blocking group.

It is to be understood that the foregoing detailed description and specific examples, while indicating preferred embodiments of the present invention, are given by way of illustration and not limitation. Many changes and modifications within the scope of the present invention may be made without departing from the spirit thereof, and the invention includes all such modifications.

What is claimed is:

1. A polymeric material comprising a blocked photographically useful group (PUG), said blocked photographically useful group comprising a PUG and a blocking group that is capable of releasing said PUG upon processing the photographic element, wherein said blocking group (a) is capable of reacting with a dinucleophile reagent, and (b) comprises two electrophilic groups that are separated from each other by a substituted atom that enables a nucleophilic displacement reaction to occur with release of PUG upon processing said photographic element in the presence of a dinucleophile reagent, wherein the group that is less electrophilic is bonded directly or through at least one releasable timing group to said PUG.

2. A polymeric material as claimed in claim 1 which comprises a plurality of monomeric units which individually comprise said blocked photographically useful group.

3. A polymeric material as claimed in claim 1, comprising a plurality of monomeric units which are polymerizable by addition or condensation polymerization.

4. A polymeric material as in claim 1, comprising a group of the formula $$BG-(T)_n-PUG$$

wherein

BG is a blocking group which can be cleaved by a dinucleophile,

T is a timing group, n is an integer from 0 to 3, and

PUG is a photographically useful group.

5. A polymeric material as in claim 4 wherein said polymeric material comprises monomeric units selected from the group consisting of

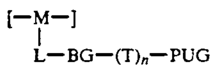
(a)

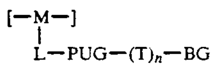
(b)

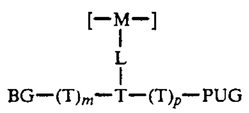
(c)

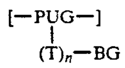
(d)

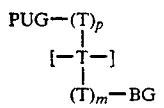
(e)

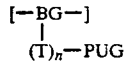
(f)

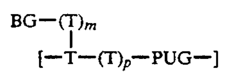
(g)

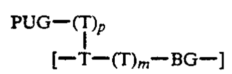
(h)

$[-BG-(T)_n-PUG-]$ (i)

or mixtures thereof, wherein

M is a polymerizable monomer,

L is a single bond or a linking group

T is a timing group

BG is a blocking group

PUG is a photographically useful group n is an integer from 0 to 3 m and p are integers chosen such that the sum m+p is from 0 to 2.

6. A polymeric material as claimed in claim 4 wherein said blocking group BG comprises the group:

$$E_1-(Y^1)-E_2$$

wherein $E_1$ and $E_2$ independently are electrophilic groups, wherein $E_1$ is more electrophilic than $E_2$, and wherein $E_2$ $Y^1$ is connected to $(T)_n$ - PUG, and is a substituted atom that provides a distance between $E_1$ and $E_2$ that enables a nucleophilic displacement reaction to occur with release of a photographically useful group upon processing said photographic element in the presence of a dinucleophile.

7. A polymeric material as claimed in claim 6, wherein said blocking group is further connected to said polymer molecule through at least one of the groups $E_1$, $E_2$ or $Y^1$ other than through said $(T)_n$-PUG connected to said group $E_2$.

8. A polymeric material as claimed in claim 4 wherein said blocking group BG comprises the group:

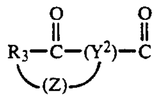

wherein $R_3$ is unsubstituted or substituted alkyl, unsubstituted or substituted aryl, or the atoms necessary with Z to complete a ring with $Y^2$, Z represents the atoms necessary to complete a carbocyclic or heterocyclic ring with $R_3$ and $Y^2$, $Y^2$ is substituted atom that provides a distance between the carbonyl groups that enables a nucleophilic displacement reaction to occur with release of a photographically useful group upon processing said photographic element in the presence of a dinucleophile, and q is 0 or 1.

9. A polymeric material as claimed in claim 8, wherein said blocking group is further connected to said polymer molecule through at least one of the groups $R_3$, Z, or $Y^2$ other than through said $(T)_n$-PUG connected to said group $E_2$.

10. A polymeric material as claimed in claim 4 wherein said blocking group BG comprises the group:

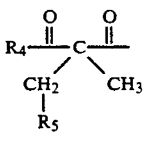

wherein $R_4$ is unsubstituted or substituted alkyl, unsubstituted or substituted aryl, or a linking group or bond to said polymer, and $R_5$ is hydrogen or a linking group or bond to said polymer.

11. A polymeric material as claimed in claim 4 wherein said blocking group BG comprises the group:

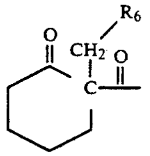

wherein $R_6$ is hydrogen or a linking group or bond to said polymer.

12. A polymeric material as claimed in claim 11, wherein one of the four methylene groups in said ring is replaced with a heteroatom.

13. A polymeric material as claimed in claim 12, wherein said heteroatom is a nitrogen atom.

14. A polymeric material as claimed in claim 11, wherein one or the cyclohexyl methylene groups is substituted with a group $R_7$, wherein $R_7$ is an alkyl, aryl, heterocyclic, amide, ester, ether, sulfonamide or carboxyl group or a linking group or bond to said polymer.

15. A polymeric material as claimed in claim 12, wherein said heteroatom comprises a group $R_8$, wherein $R_8$ is an alkyl, aryl, heterocyclic, acyl, alkylsulfonyl or arylsulfonyl group, or an —N—C(O)— group, or a linking group or bond to said polymer.

16. A polymeric material as claimed in claim 1, wherein PUG is a dye, image dye-forming coupler, development inhibitor releasing coupler, competing coupler, crosslinking group, development inhibitor, development accelerator, bleach inhibitor, bleach accelerator, dye, dye precursor, developing agent, electron transfer agent, reducing agent, silver ion fixing agent, silver halide solvent, silver halide complexing agent, image toner, pre-processing image stabilizer, post-processing image stabilizer, hardener, tanning agent, fogging agent, antifoggant, ultraviolet radiation absorber, optical brightener, nucleator, nucleation accelerator, chemical or spectral sensitizer or desensitizer, surfactant, antistatic agent, mordant group, mordant polymer, photographically useful polymer, or precursor thereof.

17. A polymeric material as claimed in claim 11, wherein PUG is a bleach accelerator.

18. A polymeric material as claimed in claim 11, wherein PUG is an image dye-forming coupler.

19. A polymeric material as claimed in claim 1, having a molecular weight of at least about 1000.

20. A polymeric material as claimed in claim 19, having a molecular weight of about 2000 to $10^7$.

* * * * *

UNITED STATES PATENT AND TRADEMARK OFFICE

CERTIFICATE OF CORRECTION

PATENT NO. : 5,223,581

DATED : June 29, 1993

INVENTOR(S) : R.B. Nielsen et al

It is certified that error appears in the above-indentified patent and that said Letters Patent is hereby corrected as shown below:

In Column 6, line 27, delete "$(T)_n$" and insert --$(T)_p$--.

In Column 14, line 55, after "spectral" insert --sensitizers or desensitizers, surfactants, antistatic--.

In Column 16, line 65, delete "P010" and insert --PO10--.

In Column 21, structure I-2, delete "10" and insert --15--.

In Column 24, line 19, delete "$g.m^2$" and insert --$g/m^2$--.

In Column 27, line 14, delete "0.035" and insert --0.03--.

In Column 28, structure C-4, delete "$CF_3$" and insert --$CF_2$--.

In Column 32, line 31, delete "table" and insert --tablet--.

In Column 38, line 30, delete "(Z)" and insert --$(Z)_q$--.

In Column 39, line 20, delete "or" and insert --of--.

Signed and Sealed this

Twenty-ninth Day of March, 1994

Attest:

BRUCE LEHMAN

Attesting Officer

Commissioner of Patents and Trademarks

UNITED STATES PATENT AND TRADEMARK OFFICE

CERTIFICATE OF CORRECTION

PATENT NO. : 5,223,581

DATED : June 29, 1993

INVENTOR(S) : R.B. Nielsen et al

It is certified that error appears in the above-indentified patent and that said Letters Patent is hereby corrected as shown below:

In Column 38, line12, delete "$Y^1$ is connected to $(T)_n$ - PUG, and is" and insert --is connected to $(T)_n$ - PUG, and $Y^1$ is--.

In Column 38, line 38 after "$Y^2$ is" insert --a--.

Signed and Sealed this

Tenth Day of May, 1994

Attest:

Bruce Lehman

BRUCE LEHMAN

Attesting Officer

Commissioner of Patents and Trademarks